United States Patent [19]

Shikano et al.

[11] Patent Number: 5,735,990
[45] Date of Patent: Apr. 7, 1998

[54] PROCESS FOR PRODUCTION OF CARPETS BACKSIZED WITH AN ETHYLENE/VINYL ACETATE BACKING COMPOSITION

[75] Inventors: Tsuyoshi Shikano, Gifu-ken; Isao Hanada, Zama; Masakazu Shimizu, Ichihara; Koichi Matsumoto, Yokohama, all of Japan

[73] Assignees: Ikeda Bussan Co., Ltd., Kanagawa-ken; Nippon Unicar Kabushiki Kaisha, Tokyo, both of Japan

[21] Appl. No.: 645,661

[22] Filed: May 14, 1996

[30] Foreign Application Priority Data

May 15, 1995 [JP] Japan ................. 7-138895

[51] Int. Cl.$^6$ ............. B32B 3/02; B29C 47/00; C09J 4/00
[52] U.S. Cl. ............. 156/244.11; 428/95; 428/97; 156/244.23; 156/244.24; 156/244.27; 156/308.2; 156/332
[58] Field of Search ............... 428/95, 97; 156/244.11, 156/244.23, 244.24, 244.27, 308.2, 332

[56] References Cited

U.S. PATENT DOCUMENTS

| | | | |
|---|---|---|---|
| 3,676,280 | 7/1972 | Sands ................. | 428/97 |
| 3,982,051 | 9/1976 | Taft et al. ................. | 428/87 |
| 4,243,568 | 1/1981 | Brown ................. | 260/29.6 R |
| 4,311,808 | 1/1982 | Su ................. | 525/222 |
| 4,352,849 | 10/1982 | Mueller ................. | 428/213 |
| 4,375,531 | 3/1983 | Ross ................. | 525/93 |
| 4,430,468 | 2/1984 | Schumacher . | |
| 4,434,258 | 2/1984 | Schumacher et al. . | |
| 4,438,228 | 3/1984 | Schenck . | |
| 4,443,575 | 4/1984 | Iwai et al. . | |
| 4,508,771 | 4/1985 | Peoples, Jr. et al. . | |
| 4,752,634 | 6/1988 | Goss ................. | 524/271 |
| 5,296,554 | 3/1994 | Watanabe et al. ................. | 525/207 |
| 5,416,151 | 5/1995 | Tanaka . | |

Primary Examiner—Terrel Morris
Attorney, Agent, or Firm—Panitch Schwarze Jacobs & Nadel, P.C.

[57] ABSTRACT

Disclosed is a process for producing a carpet backsized with a backing composition. The composition contains a resin component with ethylene/vinyl acetate being the principle compound and an ethylene/alpha-olefin copolymer constituting the remainder. In addition, the composition includes an inorganic filler in an amount of from 25 to 75% by weight and a dispersing agent that is atactic polypropylene. This composition is formed by kneading and pelletizing the inorganic filler and dispersing agent to form a master batch which is in turn dry-blended with the resin component of the composition, followed by extrusion through T-dies into a sheet and applied, while still melted, to the underside of a carpet base material and cooled.

6 Claims, No Drawings

PROCESS FOR PRODUCTION OF CARPETS BACKSIZED WITH AN ETHYLENE/VINYL ACETATE BACKING COMPOSITION

FIELD OF THE INVENTION

The present invention relates to a carpet backing composition suitable for being extruded onto the back of automobile carpets, and to a process for producing carpets back-sized with such a composition. Resulting carpets according to the present invention have excellent properties of, in particular, heat resistance, low-temperature resistance, and flame resistance.

DESCRIPTION OF THE PRIOR ART

Carpets to be laid on the floors of automobiles generally consist of base materials comprising fibers, which are back-sized with a thermoplastic resin of ethylene/vinyl acetate copolymer or the like in order to prevent the tuft fibers from being pulled out of the carpet surface and to provide the carpet with an improved processability for shaping. To said thermoplastic resin of ethylene/vinyl acetate copolymer or the like, usually, an inorganic filler is added at an increased concentration to provide good vibration insulation and/or sound arresting.

However, there have recently arisen increasing demands on these carpets, such as an increased heat and low-temperature resistances to retain their toughness during their use under the conditions of elevated and decreased temperatures, respectively, and an increased flame resistance to render the carpets less inflammable in fires.

Accordingly, it is an object of the present invention to meet the above requirements, that is, to provide a carpet backing composition having excellent properties of heat, low-temperature and flame resistances, as well as a process for producing carpets back-sized with such a composition.

As a result of intensive studies to attain the above object, the present inventors have succeeded to complete the present invention, which will be hereinafter described.

SUMMARY OF THE INVENTION

The present invention provides a carpet backing composition comprising:

a resin component in a ratio from 25% to 75% by weight of said carpet backing composition;

an inorganic filler in a ratio from 25% to 75% by weight of said composition; and a dispersing agent in a ratio from 1% to 20% by weight of said composition;

said resin component containing an ethylene/vinyl acetate copolymer in a ratio from 50% to 90% by weight of said resin component, having a melt index (MI) from 1 to 100 g/10 min. and a vinyl acetate content from 5% to 45% by weight of said copolymer; and an ethylene/alpha-olefin copolymer in a ratio from 10% to 50% by weight of said resin component, having an MI from 1 to 100 g/10 min. and a density from 0.86 to 0.95 g/cm$^3$.

Preferably, said ethylene/vinyl acetate copolymer in the carpet backing composition may be a mixture of two different ethylene/vinyl acetate copolymers, one of said copolymers having an MI of at least 10 g/10 min. and a vinyl acetate content from 5% to 45% by weight, and the other copolymer having an MI from 0.1 to 9 g/10 min. and a vinyl acetate content from 5% to 45% by weight.

The present invention also provides a process for producing back-sized carpets, which comprises the steps of:

kneading a carpet backing composition as described above;

extruding said composition into a sheet through an extruder equipped with T dies, to form a backing layer on base materials of said carpet while said sheet remains in its hot melted state; and cooling said sheet to form said back-sized carpet.

Preferably, said process may comprise the steps of:

preparing a master batch having an inorganic filler content from 40% to 90% by weight of said master batch from a carpet backing composition as described above, by kneading and pelletizing said inorganic filler, said dispersing agent, and, optionally, a portion of said resin component of said composition; and dry-blending said master batch and the rest of said resin component of said composition; and extruding said dry-blended mixture into a sheet through an extruder equipped with T dies, to form a backing layer on base materials of said carpet while said sheet remains in its hot melted state; and cooling said sheet to form said back-sized carpet.

DETAILED DESCRIPTION OF THE INVENTION

Ethylene/vinyl acetate copolymer to be contained in the carpet backing composition according to the present invention has an MI preferably from 1 to 100 g/10 min., more preferably from 5 to 60 g/10 min.. Also, said copolymer has a vinyl acetate content preferably from 5% to 45% by weight, more preferably from 15% to 35% by weight. MIs below 1 g/10 min. are not desirable because of poor processability and inorganic filler dispersion, while those above 100 g/10 min. are not desirable because of lower heat and low-temperature resistances of the carpet backing composition prepared. Vinyl acetate contents below 5% by weight are not desirable because of lower low-temperature resistance and poor inorganic filler dispersion, while those above 45% by weight are not desirable because of lower heat resistance.

It is preferable to employ a mixture of two different ethylene/vinyl acetate copolymers for said resin component, one of said copolymers having a higher MI and the other copolymer having a lower MI, because of increased heat and low-temperature resistances. More particularly, preferred mixture contains an ethylene/vinyl acetate copolymer having an MI of at least 10 g/10 min. and a vinyl acetate content from 5% to 45% by weight, and another ethylene/vinyl acetate copolymer having an MI from 0.1 to 9 g/10 min. and a vinyl acetate content from 5% to 45% by weight.

Ethylene/alpha-olefin copolymer, also to be contained in the carpet backing composition according to the present invention, is a copolymer of ethylene and an alpha-olefin having from 3 to 12 carbon atoms, having an ethylene content above 50% by weight, preferably above 70% by weight. Examples of such alpha-olefins can include, but not limited to, propylene, 1-butene, 1-pentene, 1-hexene, 4-methyl-1-pentene, 1-heptene, 4-methyl-1-hexene, 4,4-dimethyl-1-pentene, 1-octene, 1-decence and 1-dodecene. Said ethylene/alpha-olefin copolymer has an MI preferably from 1 to 100 g/10 min., more preferably from 5 to 60 g/10 min. The density of said copolymer preferably ranges from 0.86 to 0.95 g/cm$^3$. MIs below 1 g/10 min. are not preferred because of poor processability and inorganic filler dispersion, while those above 100 g/10 min. are not preferred because of lower heat and low-temperature resistances. Densities of ethylene/alpha-olefin copolymer below 0.86 g/cm³ result in difficulties in producing carpets back-sized with resins, while those above 0.95 g/cm³ are not preferred because of insufficient processability and inorganic filler dispersion.

The amount of the resin component incorporated into the carpet backing composition according to the present invention is the sum of the amounts of said ethylene/vinyl acetate and ethylene/alpha-olefin copolymers, and preferably ranges from 25% to 75% by weight of said carpet backing composition. Amounts of said resin component below 25% by weight are not desirable because of poor processability, while those above 75% by weight are not desirable because of lower flame resistance.

The amount of ethylene/vinyl acetate copolymer incorporated into the resin component preferably ranges from 50% to 90% by weight of said resin component. The amounts of said copolymer below 50% by weight are not desirable because of reduced low-temperature resistance, while those above 90% by weight are not desirable because of reduced heat resistance.

Of course, certain classes of resins other than the resins according to the present invention may be incorporated into the resin component, so far as not departing from the object of the present invention. Such resins include, but not limited to, polyethylenic resins, polypropylenic resins, acid-modified polyethylenic resins, and acid-modified polypropylenic resins.

The inorganic filler as a component of the carpet backing composition according to the present invention may be any inorganic fillers. Examples of said filler are calcium carbonate, clay, talc, silica, wollastonite, zeolite, diastomaceous earth, silica sand, aluminum sulfate, barium sulfate, calcium sulfate, magnesium oxide, molybdenum disulfide, aluminum hydroxide, magnesium hydroxide and the like. They may be used either solely or as a mixture with each other. Preferably, these fillers are used in a particulate form having a particle size below 50 micrometers.

The amount of the inorganic filler incorporated into the carpet backing composition according to the present invention preferably ranges from 25% to 75% by weight of said carpet backing composition. The amounts of said inorganic filler below 25% by weight are not desirable because of lower flame resistance, while those above 75% by weight is not desirable bacause of poor processability.

The dispersing agent to be contained in the carpet backing composition according to the present invention facilitates to uniformly disperse an increased concentration of the inorganic filler into the resin component comprising ethylene/vinyl acetate copolymer and ethylene/alpha-olefin copolymer. Examples of the preferred dispersing agent are atactic polypropylene, low-molecular polyethylene, polybutene, plastisizers, waxes, rosins, terpenic resins, petroleum resins, asphalt, mineral oils, vegetableoils and the like. They may be used either solely or in a mixture with each other.

The amount of the dispersing agent incorporated into the carpet backing composition according to the present invention preferably ranges from 1% to 20% by weight of said composition. The amounts below 1% by weight are not preferred because of poor dispersion of the inorganic filler, while those above 20% by weight are not preferred because of reduced low-temperature resistance of the composition prepared.

Additives other than the essential components of the carpet backing composition according to the present invention, such as antioxidants, stabilizers, antistatic agents, antiweathering agents, lubricants, flame retardants, pigments and processing aids, may be added thereto, as desired.

In order to back-size a carpet with the carpet backing composition according to the present invention, said carpet backing composition is first extruded into a sheet through an extruder equipped with T dies, then said sheet, while remaining in its hot melted state, is attached onto the back surface of base materials of said carpet, using a pressure roll, and cooled to allow said sheet to set.

This backing sheet should contain an elevated concentration of inorganic filler uniformly dispersed in the resin component so as to improve resistances against heat, low temperatures, and flames. Therefore, the carpet backing composition is preferably melted and kneaded in a Banbury mixer, a continuous mixer, a biaxial extruder or the like, before it is fed to an extruder equipped with T-dies. This step may be carried out either by first kneading the composition using mixers as above or a biaxial extruder, and then feeding the pelletized composition to an extruder equipped with T-dies, or by feeding the composition directly to an extruder equipped with both of T-dies and a biaxial extruder.

From the viewpoint of energy saving, it is also preferred to use a master batch of the inorganic filler. Thus, the inorganic filler, the dispersing agent, and, optionally, a portion of the resin component of the carpet backing composition may be melted and kneaded in a mixer as above or a biaxial extruder to prepare a master batch of the inorganic filler, and then the pelletized master batch and the rest of said resin component are dry-blended, before feeding it to an extruder equipped with T-dies. For this purpose, the inorganic filler content in the master batch preferably ranges from 40% to 90%, more preferably from 50% to 70% by weight of said master batch. The contents below 40% by weight will largely reduce the effect of energy saving, while the contents above 90% by weight are not desirable because of reduced dispersion of the inorganic filler.

EXAMPLES

The present invention will further be described by the following examples.

Evaluation of the Products

In the following examples, evaluation was made for resistances against heat, low temperatures and flames, and processability of each of the carpet backing compositions as follows:

first, the carpet backing composition was kneaded in a Banbury mixer at 150° C. for 10 minutes, pelletized, and then fed to an extruder with T-dies, or, otherwise, the inorganic filler, the dispersing agent, and, optionally, a portion of the resin component of the composition were kneaded in a Banbury mixer at 150° C. for 10 minutes, pelletized to form a master batch, and this master batch and the rest of the resin component were dry blended, and then fed to an extruder with T-dies, whereby the composition was extruded at 20° C. in a sheet form. This extruded sheet is hereafter referred to as sample for evaluation.

To test for heat resistance, a pressed sheet with a thickness of 1.5 mm was made at 175° C. from the sample for evaluation, from which sheet a 100 mm×100 mm test piece was punched out. The test piece was placed on an iron plate at 100° C., kept under a load of 255 g/cm² for 1 hour, and thereafter peeled off to inspect as to any stickiness. Test pieces without any stickiness or other anomalies were judged to be acceptable.

To test for low-temperature resistance, a pressed sheet was made as in the above test, from which a 100 mm×150 mm test piece was punched out. The test piece was kept at −30° C. for 1 hour, and thereafter subjected to 50 rounds of 180° angle bending test under −30° C., to inspect as to any irregularities. Test pieces without any irregularities were judged to be acceptable. Acceptable test pieces were further subjected to the above bending test under −35° C.

To test for flame resistance, a pressed sheet with thickness of 2.0 mm was made at 175° C. from the sample for evaluation. The sheet was subjected to a test carried out according to FMVSS302, and the sheets with a burning rate up to 80 mm/min. were judged to be acceptable.

To test for processability, the carpet backing composition was extruded into sheet form through an extruder with T-dies, and, while hot melted, the sheet was attached to the back surface of base materials of a carpet introduced from underside of the T-dies, using a pressure roll, whereby the back-sizing of the carpet was carried out. Sheets which can be processed without any irregularities at a normal rate of processing were judged to be acceptable.

Example 1

A carpet backing composition comprising 25% by weight of DQDJ™-3269 (an ethylene/vinyl acetate copolymer from Japan Unicar Co., Ltd., Tokyo, Japan, containing 28% by weight of vinyl acetate, MI=23 g/10 min.), 10% by weight of NUC™-3195 (an ethylene/vinyl acetate copolymer from Japan Unicar, containing 25% by weight of vinyl acetate, MI=4 g/10 min.), 15% by weight of NUCG™-5381 (an ethylene/1-butene copolymer from Japan Unicar, MI=20 g/10 min., density=0.925 g/cm$^3$), 45% by weight of WS™1010 (calcium carbonate from Shiraishi Calcium Co., Ltd., Tokyo, Japan), and 5% by weight of atactic polypropylene (Chiba Fine Chemicals Co., Ltd., MW=11,000) was tested, wherein DQDJ-3269, WS-1010, and atactic polypropylene were first kneaded in a Banbury mixer, then the pelletized master batch of inorganic filler was dry-blended along with the rest of the resin component, i.e., NUC-3195 and NUCG-5381 to prepare a sample for evaluation, as described above. The sample was Judged to be acceptable with respect to all the properties of heat resistance, low-temperature (−30° C. and −35° C.) resistance, flame resistance, and processability.

Example 2

A carpet backing composition comprising 15% by weight of DQDJ-3269, 15% by weight of NUC-3195, 20% by weight of NUCG-5391 (an ethylene/1-butene copolymer from Japan Unicar, MI=50 g/10 min., density=0.927 g/cm$^3$), 45% by weight of WS-1010, and 5% by weight of atactic polypropylene was tesed, wherein, the same procedures as in Example 1 were followed, except that NUCG-5391 was used instead of NUCG-5381. The sample was Judged to be acceptable with respect to all the properties as in Example 1.

Example 3

A carpet backing composition comprising 25% by weight of DQDJ-3269, 15% by weight of NUC-3195, 10% by weight of NUCG-5381, 45% by weight of WS-1010, and 5% by weight of atactic polypropylene was tested, wherein NUC-3195, WS-1010, and atactic polypropylene were first kneaded in a Banbury mixer, then the pelletized master batch of inorganic filler was dry-blended along with the rest of the resin component, i.e., DQDJ-3269 and NUCG-5381 to prepare a sample for evaluation, as described above. The sample was judged to be acceptable with respect to all the properties as in Example 1.

Example 4

A carpet backing composition comprising 40% by weight of EB™-110 (an ethylene/vinyl acetate copolymer from Japan Unicar, containing 27% by weight of vinyl acetate, MI=12 g/10 min.), 10% by weight of NUCG-5381, 45% by weight of WS-1010, and 5% by weight of atactic polypropylene was tested, wherein WS-1010 and atactic polypropylene were first kneaded in a Banbury mixer, then the pelletized master batch of inorganic filler was dry-blended with the resin component, i.e., EB-110 and NUCG-5381 to prepare a sample for evaluation, as described above. The sample was judged to be acceptable with respect to all the properties as in Example 1, except the low-temperature resistance at −35° C., for which the test proved the sample to be unacceptable.

Example 5

All of the same components as in Example 1 was kneaded in a Banbury mixer, pelletized, and extruded in a sheet form to carry out the test. The sample was Judged to be acceptable with respect to all the properties as in Example 1.

Example 6

Following the same procedures as in Example 1, except that magnesium hydroxide (Kyowa Chemicals Co., Ltd.) was used instead of calcium carbonate (WS-1010), the tests were carried out. The sample was judged to be acceptable with respect to all the properties as in Example 1.

Example 7

Following the same procedures as in Example 1, except that di(2-ethylhexyl) phthalate (a plasticizer from Oyagi Chemicals Co., Ltd.) was used instead of atactic polypropylene, the tests were carried out. The sample was judged to be acceptable with respect to all the properties as in Example 1.

Comparative Example 1

Following the same procedures as in Example 1, except that NUC-3195 was used instead of NUCG-5381 (the total amount of NUC-3195 used was 25% by weight), the tests were carried out. The sample was judged to be unacceptable with respect to heat resistance.

Comparative Example 2

Following the same procedures as in Example 1, except that NUC-781 (a high-pressure low-density polyethylene from Japan Unicar, MI=20 g/10 min., density=0.924 g/cm$^3$) was used instead of NUCG-5381, a sample sheet was prepared. The tests showed that the sample was unacceptable with respect to heat resistance.

Comparative Example 3

Using a composition comprising 15% by weight of DQDJ-3269, 5% by weight of NUC-3195, 30% by weight of NUCG-5381, 45% by weight of WS-1010, and 5% by weight of atactic polypropylene, a sample for evaluation was prepared as in Example 1. The tests showed that the sample was unacceptable with respect to low-temperature resistance.

Comparative Example 4

A composition comprising 30% by weight of DQDJ-3269, 20% by weight of NUC-3195, 25% by weight of NUCG-5381, 20% by weight of WS-1010, and 5% by weight of atactic polypropylene was tested, wherein WS-1010 and atactic polypropylene were first kneaded in a Banbury mixer and pelletized to form a master batch of inorganic filler, which was then dry-blended along with the resin component to prepare a sample for evaluation. The tests showed that the sample was unacceptable with respect to flame resistance.

Comparative Example 5

A composition comprising 15% by weight of DQDJ-3269, 80% by weight of WS-1010, and 5% by weight of atactic polypropylene was tested, wherein entire components were kneaded in a Banbury mixer at a time and pelletized to prepare a sample for evaluation. The tests showed that the sample was unacceptable with respect to processability.

Comparative Example 6

A composition comprising 20% by weight of DQDJ-3269, 10% by weight of NUCG-5381, 45% by weight of WS-1010, and 25% by weight of atactic polypropylene was tested, wherein WS-1010 and atactic polypropylene were first kneaded in a Banbury mixer and pelletized to form a master batch of inorganic filler, which was then dry-blended along with the resin component to prepare a sample for evaluation. The tests showed that the sample was unacceptable with respect to low-temperature resistance.

As clarified in the above description, the carpet backing composition according to the present invention, containing an inorganic filler and a dispersing agent in addition to a resin component consisting of ethylene/vinyl acetate copolymer and ethylene/alpha-olefin copolymer, can meet the constantly increasing requirement for heat, low-temperature and flame resistances. An additional advantage can be provided by using ethylene/vinyl acetate copolymers having a higher melt index in combination with those having a lower melt index, in that products of more excellent qualities are obtainable. The present invention also provides a process for producing carpets with an improved dispersion of the inorganic filler using such compositions, and a process for producing carpets wherein a certain degree of energy saving has been attained, using a master batch of the inorganic filler.

Although the present invention has been described in detail with reference to certain examples, those having ordinary skill in the art will readily understand that a variety of modification of the specified components and apparatuses may be made without departing from the scope and spirit of the invention. Accordingly, the intellectual properties involved in this invention are defined only by the following claims and any reasonable extensions thereof.

What is claimed is:

1. In a process for producing a back-sized carpet, wherein the process comprises applying a backing composition on an underside of a carpet base material, the improvements comprising:

(a) that said backing composition comprises:

(i) a resin component in an amount of from 25% to 75% by weight of said backing composition, said resin component consisting essentially of 50% to 90% by weight of a mixture of a first ethylene/vinyl acetate copolymer and a second ethylene/vinyl acetate copolymer different from the first ethylene/vinyl acetate copolymer, said first ethylene vinyl acetate copolymer having a melt index from 10 to 100 g/10 min. and a vinyl acetate content from 5% to 45% by weight and said second ethylene/vinyl acetate copolymer having a melt index from 0.1 to 9 g/10 min. and a vinyl acetate content from 5% to 45% by weight; and 10% to 50% by weight of an ethylene/alpha-olefin copolymer having a melt index from 1 to 100 g/10 min. and a density from 0.86 to 0.95 g/cm$^3$;

(ii) an inorganic filler in an amount from 25% to 75% by weight of said backing composition; and (iii) an atactic polypropylene as a dispersing agent in an amount from 1% to 20% by weight of said backing composition; and (b) said process further comprises kneading and pelletizing said inorganic filler and said dispersing agent of said backing composition to prepare a master batch having an inorganic filler content from 40% to 90% by weight of said master batch;

dry-blending said master batch and said resin component to form a dry-blended mixture;

extruding said dry-blended mixture into a sheet through an extruder equipped with T-dies, on the underside of said carpet base material to form a backing layer while said sheet remains in its hot-melted state; and cooling said sheet to form said back-sized carpet.

2. The process according to claim 1, wherein said first ethylene vinyl acetate copolymer and said second vinyl acetate copolymer each have a vinyl acetate content of from 15% to 35% by weight.

3. The process according to claim 1, wherein said master batch further comprises a portion of said resin component and said process further comprises dry-blending said master batch with a remainder of said resin component.

4. A process for producing a back-sized carpet, comprising the steps of:

kneading and pelletizing an inorganic filler and an atactic polypropylene dispersing agent to prepare a master batch comprising 40% to 90% by weight of said inorganic filler;

dry-blending said master batch and a resin component to form a dry-blended mixture, said resin component consisting essentially of 50% to 90% by weight of a mixture of a first ethylene/vinyl acetate copolymer and a second ethylene/vinyl acetate copolymer different from the first ethylene/vinyl acetate copolymer, said first ethylene vinyl acetate copolymer having a melt index from 10 to 100 g/10 min. and a vinyl acetate content from 5% to 45% by weight and said second ethylene/vinyl acetate copolymer having a melt index from 0.1 to 9 g/10 min. and a vinyl acetate content from 5% to 45% by weight; and 10% to 50% by weight of an ethylene/alpha-olefin copolymer having a melt index from 1 to 100 g/10 min. and a density from 0.86 to 0.95 g/cm$^3$;

extruding said dry-blended mixture into a sheet through an extruder equipped with T-dies, to form a backing layer on the base material of said carpet while said sheet remains in its hot-melted state, said sheet being formed from a backing composition comprising from 25% to 75% by weight of said resin component, from 25% to 75% by weight of said inorganic filler, and from 1% to 20% by weight of said dispersing agent; and cooling said sheet to form said back-sized carpet.

5. The process according to claim 4, wherein said first ethylene vinyl acetate copolymer and said second vinyl acetate copolymer each have a vinyl acetate content of from 15% to 35% by weight.

6. The process according to claim 4, wherein said master batch further comprises a portion of said resin component and said process farther comprises dry-blending said master batch with a remainder of said resin component.

* * * * *